United States Patent [19]

Halbirt

[11] Patent Number: 5,543,088
[45] Date of Patent: Aug. 6, 1996

[54] RANDOM PACKING

[75] Inventor: John P. Halbirt, Spring, Tex.

[73] Assignee: Jaeger Products, Inc., Houston, Tex.

[21] Appl. No.: 365,939

[22] Filed: Dec. 29, 1994

[51] Int. Cl.$^6$ .................................................. B01F 3/04
[52] U.S. Cl. ............................ 261/94; 261/DIG. 72
[58] Field of Search ........................... 261/94, DIG. 72

[56] References Cited

U.S. PATENT DOCUMENTS

| | | |
|---|---|---|
| 3,266,787 | 8/1966 | Eckert . |
| 3,311,356 | 3/1967 | Eckert . |
| 4,041,113 | 8/1977 | McKeown . |
| 4,203,935 | 5/1980 | Hackenjos . |
| 4,277,425 | 7/1981 | Leva . |
| 4,303,599 | 12/1981 | Strigle, Jr. et al. . |
| 4,327,043 | 4/1982 | Leva . |
| 4,333,892 | 6/1982 | Ellis et al. . |
| 4,425,285 | 1/1984 | Shimoi et al. . |
| 4,511,519 | 4/1985 | Hsia . |
| 4,575,435 | 3/1986 | Kuhl . |
| 4,581,299 | 4/1986 | Jager . |
| 4,668,442 | 5/1987 | Lang . |

FOREIGN PATENT DOCUMENTS

| | | |
|---|---|---|
| 1129931 | 5/1962 | Germany . |
| 2313287 | 9/1974 | Germany . |
| 2845804 | 5/1979 | Germany . |
| 925374 | 5/1982 | U.S.S.R. . |
| 990277 | 1/1983 | U.S.S.R. . |
| 1541433 | 2/1979 | United Kingdom . |
| 1541432 | 2/1979 | United Kingdom . |
| 1602183 | 11/1981 | United Kingdom . |

OTHER PUBLICATIONS

"Physical Properties of Metal Packings"promotional of Jaeger Tri–Packs, Inc., 1 page.
"Tower Packings, Internals and Column Designs—All From One Company"promotional of Jaeger Tri–packs, Inc., 1985 (apparently), 4 pages.
"Jaeger Column Packing and Internals Give High Performance"advertisement of Jaeger Products, Inc., 1987, 1 page.
"Tri–packs® High Performance Column Packing" promotional of Jaeger Tri–packs, Inc., 1985 (apparently), 6 pages.
"Koch—Everything You Need in Tower Packing and Internals"promotional of Koch Engineering Company, Inc., 6 pages.
"Tower Packings and Internals" Bulletin Number 217–Third Edition, of Glitsch, Inc., 3 pages.
Advertisement for Snowflake™packing by Norton Chemical Process Products, page 42 of March, 1988 edition of Ground Water Age.

*Primary Examiner*—Tim R. Miles
*Attorney, Agent, or Firm*—E. Richard Zamecki

[57] ABSTRACT

Disclosed is a random packing element for use in exchange process apparatus, for example. The packing element features bowed strips and projections to provide an abundant supply of liquid flow surfaces, drip points and gas flow-through passages to enhance the interfacing of fluids in the exchange process packing bed, with various shapes for the packing element achieved by selecting the pattern of bowing of the strips and the attachment areas. The packing element also displays strips shortened to prevent collapse of the packing element, and ribs for strengthening the strips, projections and attachment areas.

20 Claims, 5 Drawing Sheets

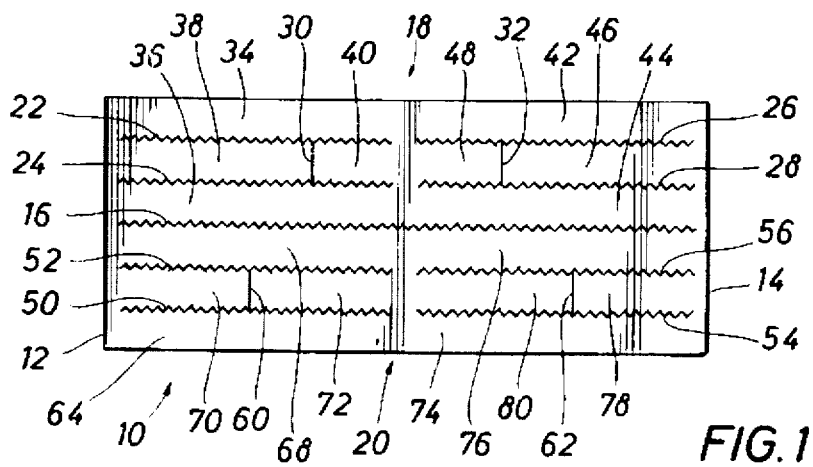
FIG. 1
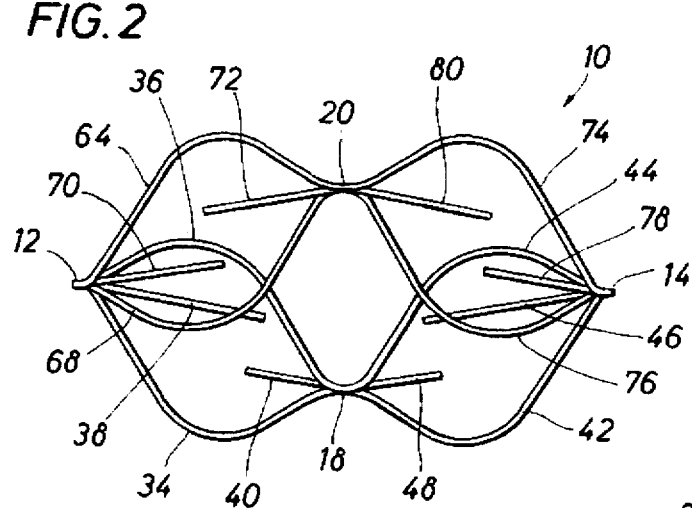
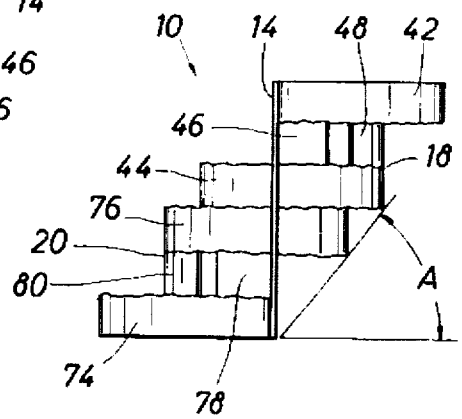
FIG. 3
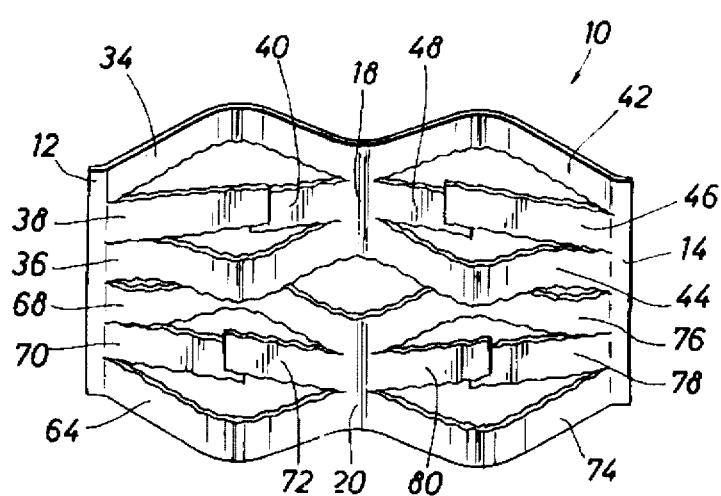
FIG. 4

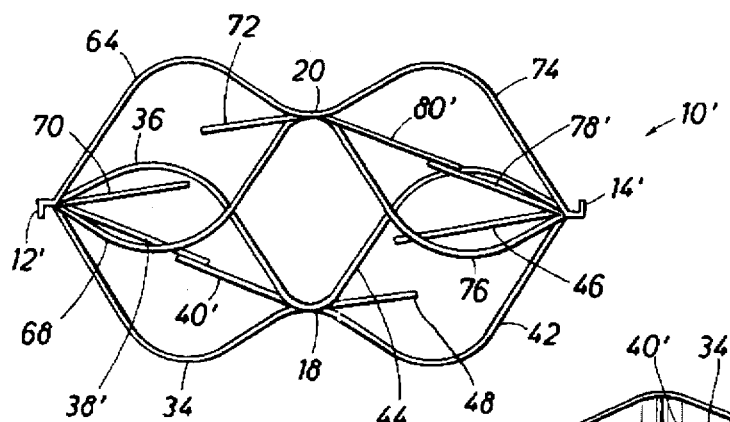
FIG. 5
FIG. 6
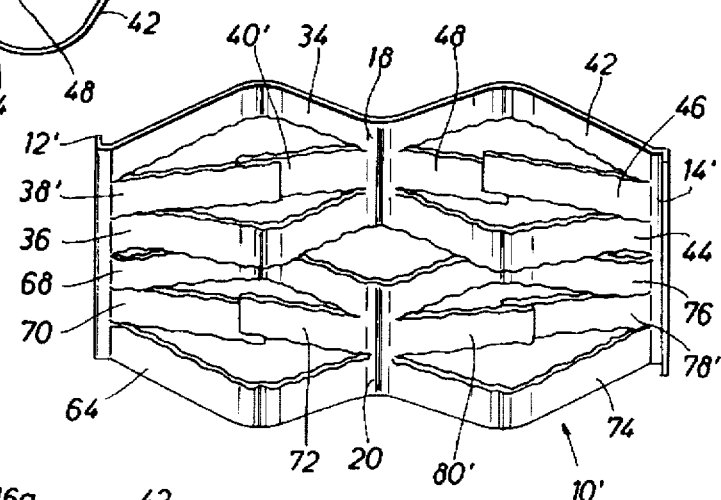
FIG. 7
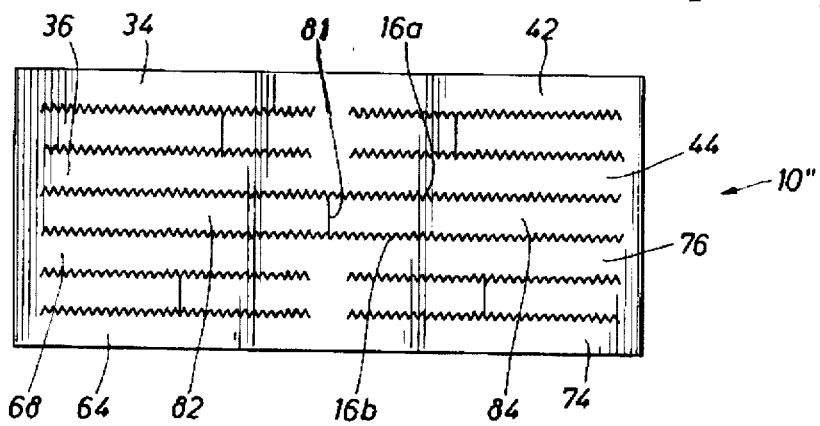
FIG. 8
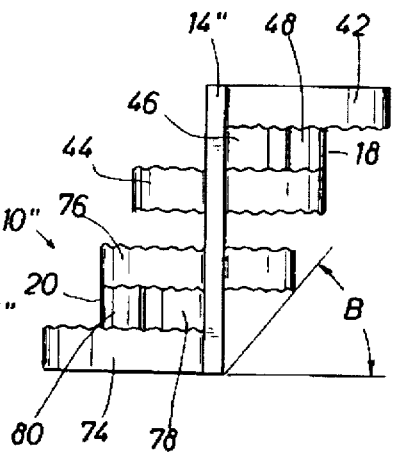
FIG. 10

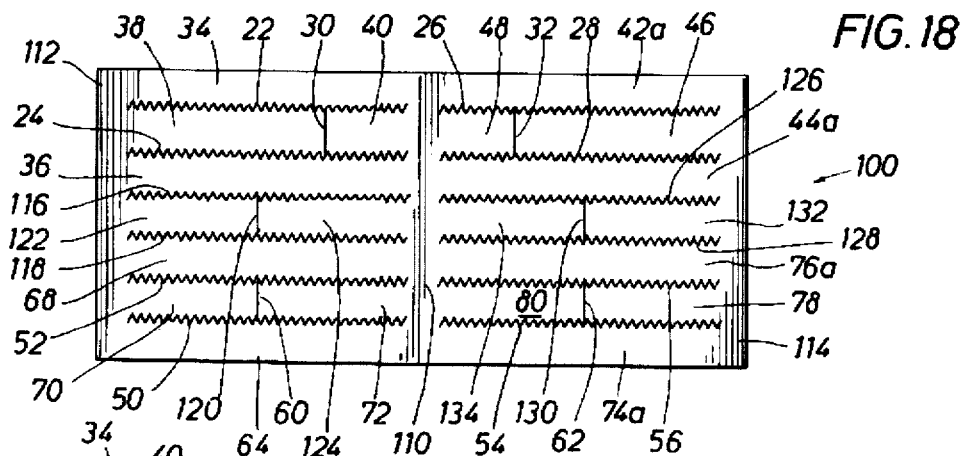
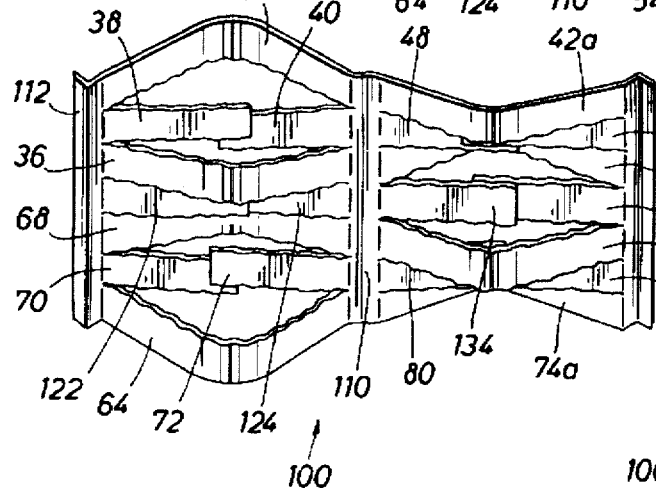
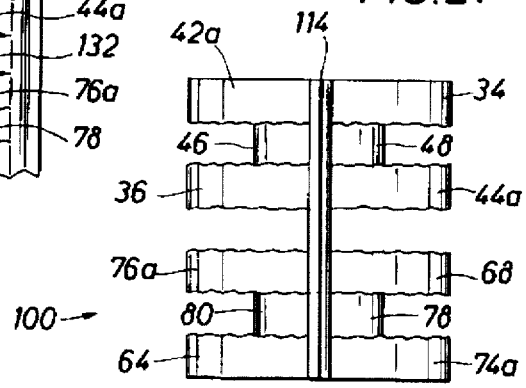
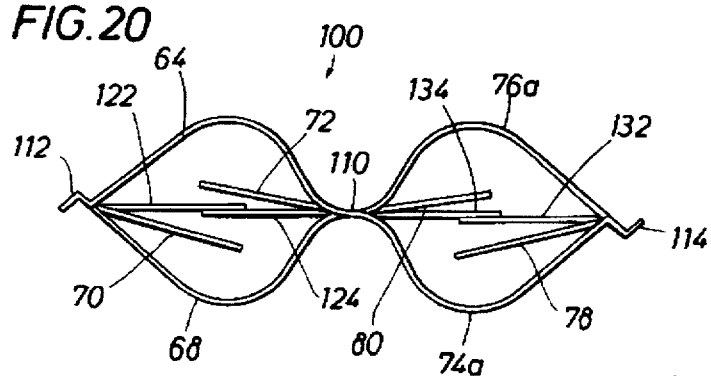
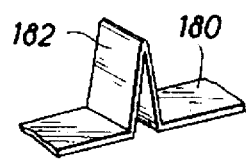
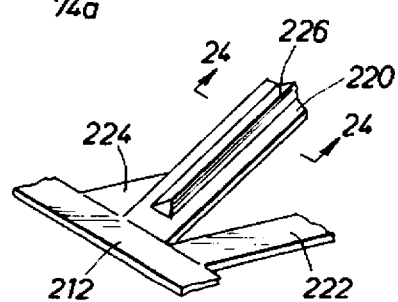
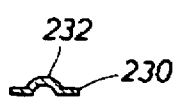

RANDOM PACKING

BACKGROUND OF THE INVENTION

1. Field of the Invention

The present invention pertains to techniques for enhancing exchange processes between two fluids. More particularly, the present invention relates to packing elements for use in exchange process chambers, such as are utilized in mass transfer or heat exchange processes, for example.

2. Brief Description of Prior Art

Many commercial and chemical processes involve mass transfer or heat exchange, and utilize packed columns or chambers to carry out the steps. Such processes can include distillation, absorption and desorption, gas cleaning and drying, scrubbing and various biological processes, such as filtrations. Two fluids, usually a gas and a liquid, although two liquids may be utilized, are intermingled within a chamber, typically as counter-current flow streams wherein the two fluids move generally in opposite senses along the same flow axis. In a co-current system, the two fluids move generally in the same sense along a single flow axis; a cross-current facility features the two fluids moving along separate, intersecting flow axes.

The mass transfer rates and/or the reaction rates of the processes increase with increasing amounts of effective surface area that can be wetted by liquid within the chamber and over which the two fluids can then interface with each other. Packing elements are placed in the chamber to increase the amount of surface area available for such interfacing. Packing systems are generally of two types, depending on the packing elements and their arrangements in the transfer chamber. Structured packing systems generally include extended, structured packing elements that are arranged within the chamber. Random packing systems comprise generally small, individual packing elements which may be dumped into the exchange chamber in a random array.

Packing is generally included in exchange process columns to enhance the interaction between two fluids in the column, thereby increasing the efficiency of the process. Where at least one of the fluids is a liquid, the interaction between the fluids may be so enhanced by providing sufficient surface area to be wetted by the liquid, and providing drip points from which the liquid may pass from one surface to another while being further exposed to gas as the other liquid flowing between the surfaces. If the surfaces provided by the packing are too tightly-arranged, the gas may experience sufficient flow resistance to hamper movement of the gas through the packing, thereby diminishing the opportunity for exposure of the liquid to the gas. Poorly-designed random packing elements may feature significant mutually-complementary structures so that one such element may fit relatively tightly against another, or even extend within the lateral extent of the second element. Such nesting of random packing elements may produce a relatively tightly-packed array of surfaces, producing significant gas flow resistance. Further, where the liquid flow surfaces are too tightly packed, liquid may bridge from one surface to another without dripping. Not only does such bridging diminish the interaction cross section with the gas, but it may also further impede the flow of gas through the packing.

U.S. patent application Ser. No. 08/291,723, filed Aug. 16, 1994, which is a continuation of U.S. patent application Ser. No. 08/049,573, filed Apr. 19, 1993, now abandoned, and which issued on May 2,1995, as U.S. Pat. No. 5,411,681, provides random packing elements which avoid the aforementioned disadvantages of previously-available packing elements. The packing element disclosed in the '723 application is shown in FIGS. 1–4 herein, and comprises material forming strips extending between attachment areas and projections from attachment areas. The present invention provides improvements on such packing elements.

SUMMARY OF THE INVENTION

It is an object of the present invention to provide a random packing element that will enhance the possibility of interaction between two fluids in an exchange process chamber, for example, and which provides improvements over the packing element of the '723 patent application. The exchange process interaction may be so enhanced by a packing element of the present invention providing an arrangement of flow surfaces that are wettable by at least one of the fluids as a liquid, for example, with the surfaces appropriately separated to reduce flow resistance therethrough by another fluid as a gas. It is a further object of the present invention to provide an abundance of drip points from the flow surfaces, with the drip points sufficiently separated to minimize bridging of liquid from a drip point to another flow surface. It is a still further object of the present invention to minimize nesting of multiple such packing elements in a packed bed in an exchange process chamber.

The present invention provides a random packing element for use in exchange process apparatus involving at least two fluids, with the packing element made from a generally planar sheet of material that is separated into a plurality of strips and projections, with attachment areas at both opposite ends of the material to which strips and projections are attached. Attachment areas may be provided intermediate the ends of the material, with strips attached to such intermediate attachment areas; projections may also be attached at such intermediate attachment areas. The projections, or fingers, provide drip points. Additionally, edges of the projections and/or the strips may be serrated to provide drip points. The serrated edges serve also to avoid nesting of multiple such packing elements.

The packing element may provide some strips bowed relative to the plane defined by the two end attachment areas, and at least one strip generally straight. Such a straight strip may be formed by two projections that are joined together, or may include a fold in the material to shorten the length of the generally straight strip, for example. Also, two strips extending in generally opposite senses from an intermediate attachment area to each of the two end attachment areas and generally extending along a common plane that is perpendicular to the plane defined by the two end attachment areas may be bowed in opposite senses relative to the plane defined by the two end attachment areas.

Additionally, at least one of the attachment areas, or one of the strips, or one of the projections may include a rib extending generally longitudinally along at least a portion of the length of the respective attachment area, strip or rib.

The packing element may be made of metal or any other appropriate material, such as plastic, which may be utilized in a particular exchange process application, for example. A metal sheet, for example, may be slit and then deformed from its original planar form to bow the resulting strips and extend the resulting projections, for example. The original slitting of the material may be made with saw-tooth patterned cuts to provide serrated edges along the strips and projections, for example. Alternatively, serrations may be formed as a separate step, for example, such as during the extending of the bows and strips.

The present invention provides a random packing element which includes liquid flow surfaces appropriately separated to provide minimal gas flow resistance through the random packing element. Drip points are also provided to further enhance the interaction possibilities between the fluids in the exchange process application. A random packing element according the present invention also minimizes nesting among such packing elements to further ensure minimal flow resistance to gas through a bed made of packing elements according to the present invention, and to ensure an abundance of drip points from appropriately separated flow surfaces.

BRIEF DESCRIPTION OF THE DRAWING

FIG. 1 is a top plan view of a planar sheet of material, slit to define a plurality of strips and projections;

FIG. 2 is a side elevation of a random packing element, formed from the slit sheet of material of FIG. 1;

FIG. 3 is an end elevation of the packing element as formed in FIG. 2;

FIG. 4 is a perspective view of the packing element of FIGS. 2 and 3;

FIG. 5 is a side elevation of a random packing element featuring improvements of shortened strips, constructed by joining projections, and structured end attachment areas, according to the present invention;

FIG. 6 is a perspective view of the improved packing element of FIG. 5;

FIG. 7 is a top plan view of a planar sheet of material, slit to define a plurality of strips and projections including two centrally-located, in-line projections extending from the two end attachment areas;

FIG. 8 is a side elevation of a packing element formed from the sheet of material of FIG. 7, with the central projections joined to form a strip that prevents the packing element from extending longitudinally, and further featuring structured end attachment areas, according to the present invention;

FIG. 10 is an end elevation of the packing element of FIGS. 8 and 9;

FIG. 18 is a top plan view of a planar sheet of material, slit to define a plurality of strips and projections, and including an intermediate attachment area extending the width of the sheet;

FIG. 19 is a perspective view of a packing element formed from the sheet of material of FIG. 18, with in-line strips bowed in opposite senses relative to the plane defined by the two end attachment areas, and with projections located along the center of the sheet joined together to form shortened strips to prevent extension of the packing element, according to the present invention;

FIG. 20 is a side elevation of the packing element as formed in FIG. 19, showing connected central projections, and the projections and bowed strips in the forward half of the packing element;

FIG. 21 is an end elevation of the packing element of FIGS. 19 and 20.

FIG. 22 is a fragmentary perspective view of a strip, folded to be shortened to prevent extension of a packing element according to the present invention;

FIG. 23 is a fragmentary perspective view of the end of a member such as a strip or a projection, at an attachment area, illustrating a ridge formed along the member;

FIG. 24 is a cross-sectional view, taken along line 24—24 in FIG. 23, of the ridged packing element member illustrated in FIG. 23; and FIG. 25 is a cross-sectional view of a packing element member, such as a strip or a projection, showing another profile for a ridge along the member.

DESCRIPTION OF PREFERRED EMBODIMENTS

Figure 9:
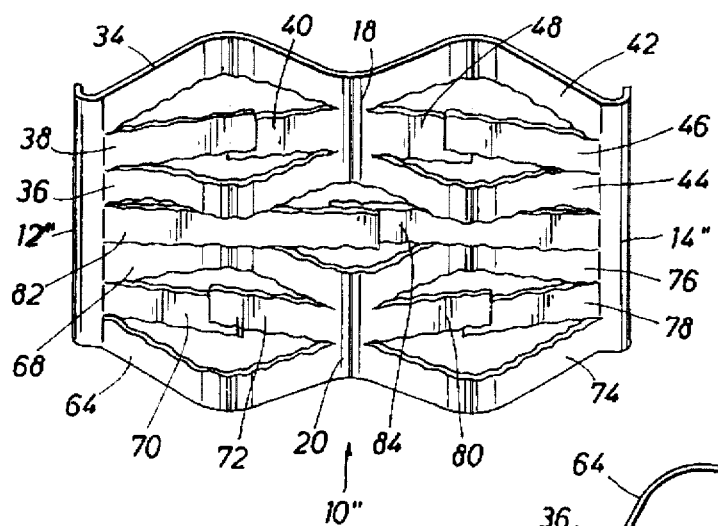
FIG. 9 is a perspective view of the improved packing element as formed in FIG. 8.

A generally-rectangular, planar sheet of material is shown generally at 10 in FIG. 1; the material 10 is shown in FIGS. 2–4 formed into a random packing element according to the invention disclosed in the aforementioned '723 patent application and of which the present invention is an improvement. The material 10 may be metal or some other material, such as plastic. In general, the material 10 is provided with slits that define a plurality of strips and a plurality of projections, which are shaped to deform the planar material as illustrated in FIG. 1 into a three-dimensional construction as illustrated in FIGS. 2–4.

As may be appreciated by reference to FIG. 1, wherein the sheet of material 10 is illustrated in its planar form, the particular embodiment of the packing element illustrated in FIGS. 1–4 is constructed from a sheet of material whose length is on the order of approximately two and one-half times the width of the sheet. The slits are shown extending generally lengthwise relative to the dimensions of the sheet 10 to form the strips and projections. All of the lengthwise slits provided in the material 10 are saw-toothed to provide serrated edges. A strip is a generally elongate portion of the sheet of material which is attached at both ends of the strip; a projection, or finger, is considered to be a generally elongate portion of the sheet of the material attached at only one end of the projection. It will be appreciated, however, that, in any given case, the extent of the projection away from its attached end may be greater than, equal to or smaller than the extent of the projection measured along the attached end of the projection. The region where one or more strips and/or one or more projections may be attached to the sheet of material may be referred to as an attachment area. Consequently, a strip extends between two attachment areas, and a projection extends from one attachment area.

In the particular embodiment of the packing illustrated in FIGS. 1–4, none of the slits extends through either end of the material 10. Consequently, a laterally-extending end attachment area 12 is provided at one end of the material, and a laterally-extending end attachment area 14 is provided at the opposite end of the material. If a slit would extend through the end of the material, then the end region of the material might be broken into at least two attachment areas.

A single, saw-tooth slit 16 extends generally along the center line of the material 10, from one end attachment area 12 to the other end attachment area 14. The slit 16 generally divides the material into two portions, as may be appreciated particularly by reference to FIGS. 1, 2 and 4.

At the midpoint of the top half of the sheet of material 10 as viewed in FIG. 1, a laterally-extending, intermediate attachment area shown generally at 18 is unbroken by any slits. Similarly, a laterally-extending, intermediate attachment area shown generally at 20 is provided about the midpoint of the bottom half of the sheet of material 10 as illustrated in FIG. 1.

In the upper haft of the material as viewed in FIG. 1, two parallel saw-tooth slits 22 and 24 extend from the end attachment area 12 to the intermediate attachment area 18, and two parallel saw-tooth slits 26 and 28 extend between the intermediate attachment area 18 and the end attachment area 14. A laterally-extending slit 30 extends between the two slits 22 and 24, and a laterally-extending slit 32 extends between the two slits 26 and 28.

The slit 22 cooperates with the outer edge of the sheet of material 10 to define, in part, a strip 34 which extends between the end attachment area 12 and the intermediate attachment area 18. The slit 24 cooperates with a portion of the slit 16 to define, in part, a strip 36 extending between the attachment areas 12 and 18 as well. The two slits 22 and 24 provide a projection 38, which ends at the slit 30 and is attached, between the strips 34 and 36, at the end attachment area 12. Similarly, a projection 40 is formed to extend from the intermediate attachment area 18 to the slit 30, bounded also by the slits 22 and 24. The strips 34 and 36 are mutually parallel in the configuration of FIG. 1.

The slit 26 cooperates with the outer edge of the sheet of material 10 to define, in part, a strip 42 which is generally aligned with the strip 34 in FIG. 1. The slit 28 cooperates with a portion of the slit 16 to define, in part, a strip 44 which is mutually parallel with the strip 42 and generally aligned with the strip 36 in FIG. 1. Both of the strips 42 and 44 extend between the attachment areas 14 and 18. The slits 26 and 28, as well as the slit 32, cooperate to form a projection 46 extending from the end attachment area 14. The slits 26 and 28, as well as the slit 32, also cooperate to form a projection 48 extending from the intermediate attachment area 18. The projections 38, 40, 46 and 48 are generally aligned in FIG. 1.

A similar construction of strips and projections is provided in the lower half of the sheet of material 10 as viewed in FIG. 1, again provided by an array of slits, most of which are illustrated as saw-tooth in profile. Slits 50 and 52 are generally mutually parallel, and aligned generally with slits 54 and 56, respectively. Laterally-extending straight slits 60 and 62 help define projections. Thus, the slit 50 cooperates with the outer edge of the sheet of material 10 to define, in part, a strip 64 extending between the attachment areas 12 and 20. Slit 52 cooperates with a portion of the slit 16 to define a strip 68, also extending between attachment areas 12 and 20 and being mutually parallel with the strip 64. Between the strips 64 and 68 are projections 70 and 72, defined, in part, by the slits 52, 50 and 60. The projection 70 extends from the end attachment area 12 while the projection 72 extends from the intermediate attachment area 20.

The slit 54 cooperates with the outer edge of the sheet of material 10 to define, in part, a strip 74, while the slit 56 cooperates with a portion of the slit 16 to define a strip 76. The strips 74 and 76 are mutually parallel in FIG. 1, and extend between the attachment areas 14 and 20, with the strip 74 generally aligned with the strip 64 and the strip 76 generally aligned with the strip 68. The slits 54, 56 and 62 also define, in part, projections 78 and 80 positioned between the strips 74 and 76 and extending from the attachment areas 14 and 20, respectively. In FIG. 1, the projections 70, 72, 78 and 80 are generally mutually aligned.

With the various slits provided in the sheet of material 10 as illustrated in FIG. 1, the resulting strips and projections may be bent or otherwise deformed to provide the packing element as illustrated in FIGS. 2–4. For example, if the positions of the end attachment areas 12 and 14 are taken to define the original plane of the sheet of material 10 as viewed in FIG. 1, then the intermediate attachment area 18 is positioned to one side of that plane while the other intermediate attachment area 20 is positioned to the opposite side of that plane. Then, as viewed in FIGS. 2 and 4, the two strips 64 and 74 are bowed upwardly while the two strips 68 and 76 are bowed downwardly relative to the plane defined by the end attachment areas 12 and 14. It will be appreciated that strips 64 and 68 both extend between the same two attachment areas 12 and 20, and, as mutually separated in the plane of the paper as illustrated in FIG. 2, form an extended but closed loop. Similarly, a closed but extended loop is formed by separating the strips 74 and 76, which extend between the same two attachment areas 14 and 20.

The two strips 34 and 42 are bowed downwardly relative to the plane defined by the end attachment areas 12 and 14, (FIGS. 2 and 4) while the two strips 36 and 44 are bowed upwardly relative to that plane. Thus, an extended but closed loop is provided by the two strips 34 and 36 which extend between the same two attachment areas 12 and 18. Also, an extended but closed loop is provided by the two strips 42 and 44 which extend between the same two attachment areas 14 and 18.

The four closed loops thus formed by the pairs of strips extending between corresponding attachment areas are mutually displaced in the plane of the paper in FIG. 2 as well as laterally displaced as viewed in FIGS. 3 and 4.

As viewed in FIGS. 2 and 4, the projections 40 and 48 are positioned to extend upwardly from the intermediate attachment area 18, while the projections 38 and 46 are positioned to extend downwardly from their respective end attachment areas 12 and 14. Also, projections 72 and 80 are made to extend downwardly from the intermediate attachment area 20 while projections 70 and 78 are positioned to extend upwardly from their respective end attachment areas 12 and 14. It will be appreciated that the angles at which the projections are positioned in FIGS. 2 and 4 may be varied. It will also be noted that the lengths of the projections may vary, and are shown as being different in the drawings. Further, it will be appreciated that the free ends of the projections may be serrated by providing the slits 30, 32, 60 and 62 as saw-toothed, for example.

The size of the packing element may be adjusted according to the application, as may therefore be the dimensions of the projections and strips, for example. It will be appreciated, however, that regardless of the overall dimensions of the packing element illustrated in FIGS. 1–4, the element provides extensive flow surfaces combined with sufficient openings between the flow surfaces to minimize gas flow resistance through the packing element. The ends of the projections provide drip points, as do the serrations along the edges of the projections and strips. The attachment areas provide additional flow paths, joining adjacent strips and projections, for example. Additionally, the attachment areas add to the structural rigidity of the finished packing element. Generally, each strip may have a different shape and/or different horizontal position, as particularly illustrated in FIG. 2. Further, with the intermediate attachment areas 18 and 20 positioned to opposite sides of the plane defined by the end attachment areas 12 and 14, for example, the end-view profile of the packing element is generally inclined at an angel A as shown in FIG. 3. Consequently, as a packing element is dropped into a process chamber, for example, there is a considerable probability that the packing element will fall to reside in an inclined position, with all of the strip and projection surfaces inclined, relative to the horizontal, for example. Additional packing elements dumped on the first packing element, for example, will take random orientations. However, the serrated edges particularly of the strips will prevent strip-nesting, that is, nesting of adjacent packing elements with strips from two packing elements generally closing off flow paths through the packing elements.

It will be appreciated that the shape of the packing element as illustrated in FIGS. 2–4 retains the ends of the material of which the packing element is made, and where the end attachment areas 12 and 14 are located, parallel and separated so as to define a plane, and that there is no axis of rotational symmetry of the packing element passing through the plane thus defined by the positions of the end attachment areas 12 and 14, at any location in that plane and at any angle to that plane, for example.

The present invention, as illustrated in FIGS. 5–25, for example, provides improvements to the packing element illustrated in FIGS. 2–4. In particular, the present invention provides packing element improvements for increased strength and rigidity, and also provides packing elements of varying shapes to produce different tendencies of the packing elements to orient themselves upon dumping in a process tower. In the embodiments of FIGS. 5–25 packing features which may be the same or essentially the same as features shown in FIGS. 1–4 are identified by like numbers; in some cases primes and/or a letter suffix are used to denote modified or otherwise unique features compared to the features of the packing element shown in FIGS. 1–4.

A modification of the packing element 10 of FIGS. 1–4 is shown generally at 10' in FIGS. 5 and 6. The packing element 10' may be constructed from the same material 10 of FIG. 1, with the same slits 16, 22–28, 32, 50–56 and 60, but with the positions of the slits 30 and 62 adjusted as needed for the reason described below. As shown in FIGS. 5 and 6, the intermediate attachment areas 18 and 20 may be displaced and the strips 34, 36, 42, 44, 64, 68, 74 and 76 bowed as illustrated in FIGS. 2-4, and the projections 46, 48, 70 and 72 extending at various angles from their respective attachment areas 12', 14', 18 or 20. However, the projections 38' and 40' are joined together, and the projections 78' and 80' are joined together. The joining of the projections in each case is done by overlapping the end of one projection over the end of the other projection and bonding the overlapped portions by an appropriate method such as use of cement, spot welding, etc. The positions of the slits 30 and 62 are chosen in the construction of the element 10' to facilitate the joining of the respective pairs of projections.

Further improvement featured by the packing element 10' includes structure added to the end attachment areas 12' and 14'. As shown in FIGS. 5 and 6, each of the end attachment areas 12' and 14' features an elongate rib or ridge, provided by a right angle bend running the length of the attachment area. The sheet of material from which the improved packing element 10' is made may be longer, for example, compared to the sheet of material used to produce the packing element 10 of FIGS. 1–4 to provide the material to make the right angle bend in each of the end attachment areas 12' and 14'.

With these improvements featured by the packing element 10', that element may nevertheless still be constructed to exhibit the skewed profile of the packing element 10 as illustrated in FIG. 3, as well as the lack of any axis of rotational symmetry passing through the plane defined by the generally parallel end attachment areas 12' and 14', at any angle and at any location in that plane.

The improvements featured by the packing element 10' in FIGS. 5 and 6 provide increased stability and strength. The joining of the pairs of projections has the effect of providing the packing element 10' with a constructed strip 38',40' extending between the intermediate attachment area 18 and the end attachment area 12', and with a constructed strip 78',80' extending between the intermediate attachment area 20 and the end attachment area 14'. These constructed strips 38',40' and 78',80' are shorter than the strips 34 and 36, and the strips 74 and 76, extending between the attachment areas 18 and 12', and between the attachment areas 20 and 14', respectively. Consequently, the relatively short strips 38',40' and 78',80' prevent the packing element 10' from collapsing by the straightening, or unbowing, of the longer strips 34, 36, 42, 44, 64, 68, 74 and 76. Thus, as multiple packing elements 10' are dumped into a process tower and stacked up, any tendency of lower packing elements to collapse due to the weight of the load of packing elements above is resisted by the shortened strips 38',40' and 78',80' limiting the distance the end attachment areas 12' and 14' may be displaced away from the intermediate attachment areas 18 and 20. The longer strips 34, 36, 42, 44, 64, 68, 74 and 76 remain bowed to retain the general shape of the packing element 10'. Additionally, the bent structure of the end attachment areas 12' and 14' defining ribs along these attachment areas resists any tendency for these attachment areas to be deformed by twisting, folding, or the like, again due to the weight of a load of other packing elements resting on the lower packing elements in a process tower, for example. As a result of the improvements shown in FIGS. 5 and 6, the packing element 10' will be stronger and more likely to retain its general shape in handling and use, for example.

Another embodiment of the improved random packing according to the present invention is shown generally at 10" in FIGS. 7-10. A sheet of material 10" is illustrated in FIG. 7 having been cut with sawtooth slits generally as in FIG. 1, but instead of a single central cut 16 extending from one end attachment area 12 to the other end attachment area 14 as shown in FIG. 1, the sheet 10" features two long serrated slits 16a and 16b, and a central lateral slit 81 to form two central projections 82 and 84, extending from structured end attachment areas 12" and 14", respectively, as shown in FIGS. 7-10. Additional projections and strips may be provided along with intermediate attachment areas, with the strips bowed, as in the packing dement 10 of FIGS. 1–4, for example. Thus, the intermediate attachment areas 18 and 20 are separated, strips 36, 44, 64 and 74 are bowed in one sense and strips 34, 42, 68 and 76 are bowed in the opposite sense relative to the plane defined by the end attachment areas 12" and 14", and the projections 38, 40, 46, 48, 70, 72, 78 and 80 are arranged at various orientations, for example, to form the packing element 10" as illustrated in FIGS. 8–10.

The two central projections 82 and 84 are overlapped and mutually bonded to form a constructed strip 82,84 extending between the two end attachment areas 12" and 14". This strip 82,84 prevents the end attachment areas 12" and 14" from separating, and therefore prevents the packing element 10" from extending and allowing the bowed strips to straighten, and thus keeps the packing element from collapsing under the weight of other packing elements in a process tower, for example. Further, the end attachment areas 12" and 14" each feature a rib or ridge formed by the area being curved through an approximately ninety degree arc as illustrated in FIGS. 8 and 9 to again provide a relatively rigid end structure to resist folding or bending of the packing element 10".

By separating the intermediate attachment areas 18 and 20 in the plane of the paper as viewed in FIG. 8, for example, the packing element 10" may be formed skewed at an angle B as illustrated in FIG. 10, for example, which angle may the same as angle A in FIG. 4, or may be different. Additionally, the packing element 10" may exhibit no axis of rotational symmetry passing through the plane defined by the generally parallel end attachment areas 12" and 14", at any angle and at any location in that plane.

It will be appreciated that each of the packing elements disclosed herein comprises an array of strips arranged so that each strip, when bowed, generally lies along and defines a plane that is perpendicular to the plane defined by the end attachment areas of the packing element. Consequently, a bowed strip extending between an end attachment area and an intermediate attachment area also lies along the same plane as another bowed strip extending from the same intermediate attachment area generally in the opposite sense to the other end attachment area. As a packing element is shaped, the strips are bowed in one sense or the other relative to the plane defined by the end attachment areas of that packing element. In the invention illustrated in FIGS. 2–4, the strips of the packing element 10 are arrayed so that any two strips extending from the same intermediate attachment area generally along a given plane that is perpendicular to the plane defined by the end attachment areas 12 and 14 are bowed in the same sense relative to the plane of the end attachment areas. This same characteristic of bowing the strips, extending along a given plane, in the same sense relative to the plane defined by the end attachment areas of the packing element is also shown in the invention as illustrated in FIGS. 5 and 6, and in FIGS. 8–10.

Figure 11:
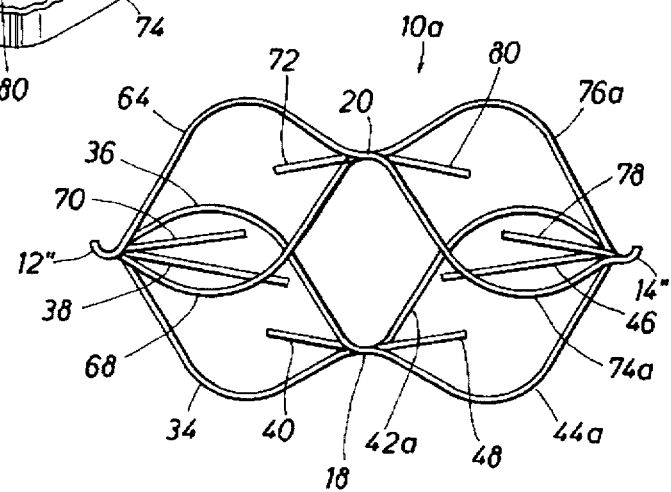
FIG. 11 is a side elevation of a random packing element featuring the improvements of in-line strips bowed in opposite senses relative to the plane defined by the end attachment areas, and structured end attachment areas, according to the present invention.
Figure 12:
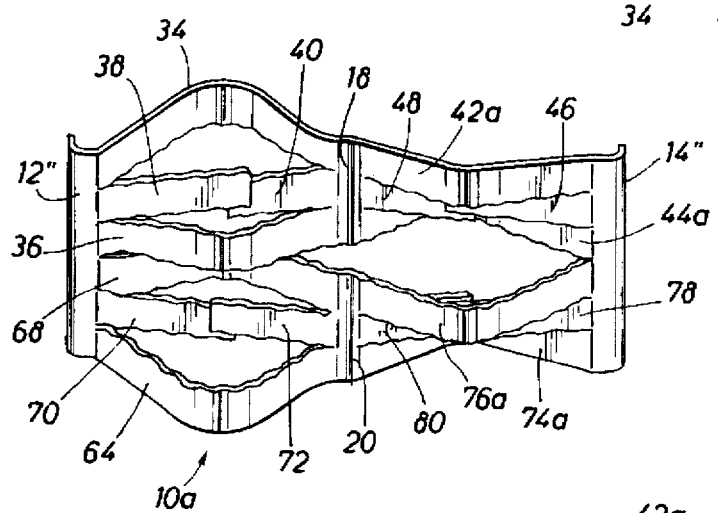
FIG. 12 is a perspective view of the improved packing element as formed in FIG. 11.
Figure 13:
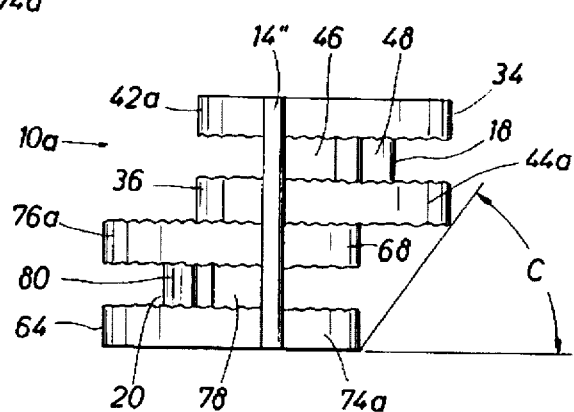
FIG. 13 is an end elevation of the packing element of FIGS. 11 and 12.

FIGS. 11–13 illustrate a packing element shown generally at 10a, formed from a sheet of material with the same slits as shown in FIG. 1 to produce the same number of strips and projections as included in the packing element 10, but with the strips bowed in a different pattern. Also, the end attachment areas 12' and 14' of the packing element 10a are curved in an approximately ninety degree arc, as in the case of the packing element 10" shown in FIGS. 7–10, to provide a rib structure for the end attachment areas to resist bending or folding of the end attachment areas, and, therefore, the packing element 10a.

The packing element 10a illustrated in FIGS. 11–13 features strips extending in opposite senses along the same plane from the same intermediate attachment area to the two end attachment areas 12' and 14', being bowed in opposite senses relative to the plane defined by the end attachment areas. The bowed strips 64 and 74a extend in opposite senses from the intermediate attachment area 20 in line along a plane that is perpendicular to the plane defined by the generally parallel end attachment areas 12" and 14", and are bowed in opposite senses relative to the plane of the end attachment areas. Likewise, the bowed strips 68 and 76a extend in opposite senses from the intermediate attachment area 20 in line along another plane that is parallel to the plane of the strips 64 and 74a, and perpendicular to the plane defined by the end attachment areas 12" and 14", and are also bowed in opposite senses relative to the plane of the end attachment areas. Additionally, the strips 36 and 44a extend in opposite senses from the intermediate attachment area 18 in line along a plane that is perpendicular to the plane defined by the generally parallel end attachment areas 12" and 14", and are bowed in opposite senses relative to the plane of the end attachment areas. Likewise, the strips 34 and 42a extend in opposite senses from the intermediate attachment area 18 in line along another plane that is parallel to the plane of the strips 36 and 44a, and perpendicular to the plane defined by the end attachment areas 12" and 14", and are also bowed in opposite senses relative to the plane of the end attachment areas. Further, the planes defined by the pairs of strips 36,44a and 34,42a are parallel to the planes defined by the sets of strips 64,74a and 68,76a, all of which planes are perpendicular to the plane defined by the end attachment areas 12" and 14". The projections 38, 40, 46, 48, 70, 72, 78 and 80 of the packing element 10a extend in various directions as in the case of the projections included in the packing element 10 shown in FIGS. 2–4.

The strip 64 is bowed in one sense relative to the plane defined by the end attachment areas 12" and 14", and the strip 74a is bowed in the opposite sense relative to the plane of the end attachment areas; by contrast, the strip 74 of the packing element 10 of FIGS. 2–4 is bowed in the same sense relative to the plane of the end attachment areas 12 and 14 as is the strip 64 which lies in the same plane as the strip 74. Similarly, in FIGS. 11–13 the strip 68 is bowed in one sense relative to the plane defined by the end attachment areas 12" and 14", and the strip 76a, in the same plane as the strip 68, is bowed in the opposite sense relative to the plane of the end attachment areas, again in contrast to the bowing of the strip 76 in the same sense as the bowing of the strip 68 relative to the plane of the end attachment areas 12 and 14 in the case of the packing element 10 of FIGS. 2–4. The strips 36 and 44a of the packing element 10a are bowed in opposite senses relative to the plane of the end attachment areas 12" and 14", and the strips 34 and 42a area bowed in opposite senses relative to the plane of the end attachment areas. Again, by contrast, in the case of the packing element 10 as illustrated in FIGS. 2–4, the strips 36 and 44a are bowed in the same sense relative to the plane of the end attachment areas 12 and 14, and the strips 34 and 42 are also bowed in the same sense relative to the plane of the end attachment areas.

The bowing of strips, extending in line along the same plane, in opposite senses relative to the plane defined by the end attachment areas of a packing element according to the present invention, provides different shapes for the packing element compared to the shapes available by only bowing strips, that extend in the same plane, in the same sense, such as in the case of the packing element 10 of FIGS. 2–4. This variation of shapes may be particularly appreciated by comparing FIGS. 12 and 13 with FIGS. 3 and 4, for example. By separating the intermediate attachment areas in the plane of the paper as viewed in FIG. 11, for example, the packing element 10a may still be shaped in a skewed fashion as is clear by reference to FIG. 13, for example, where the skewing is measured by the angle C which may be the same as either angle A or angle B of FIGS. 4 and 10, respectively, or may be different.

Figure 14:
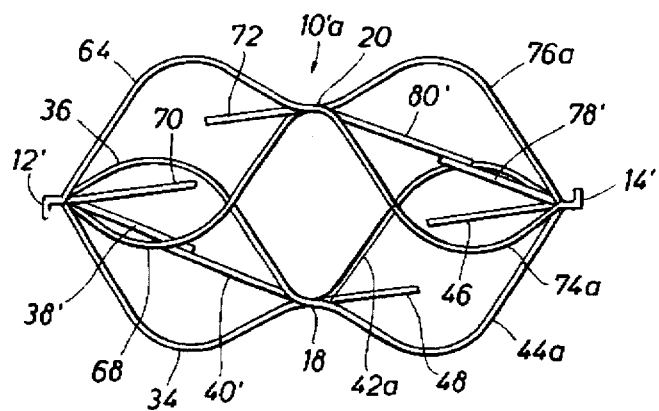
FIG. 14 is a side elevation similar to FIG. 5, but illustrating the further improvement of in-line strips bowed in opposite senses relative to the plane defined by the end attachment areas according to the present invention.
Figure 15:
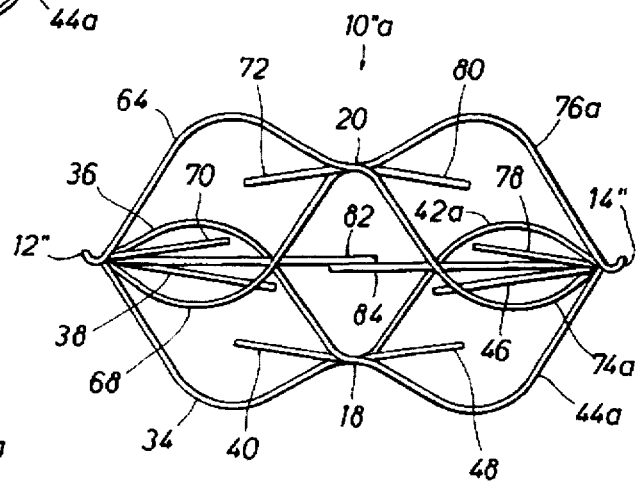
FIG. 15 is a side elevation similar to FIG. 8, but illustrating the further improvement of in-line strips bowed in opposite senses relative to the plane defined by the end attachment areas according to the present invention.
Figure 16:
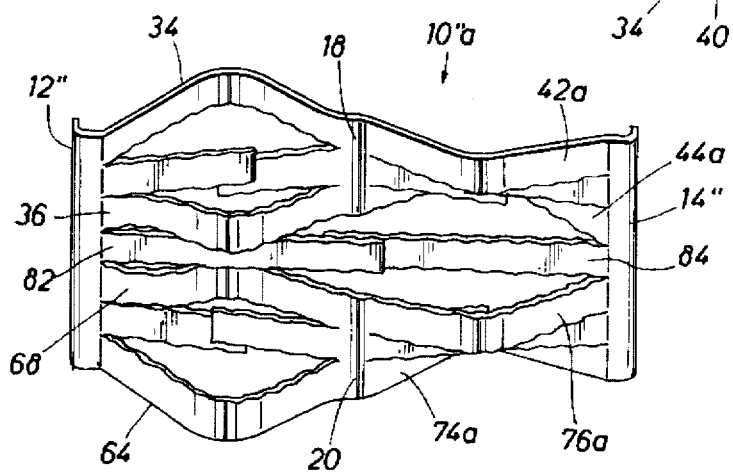
FIG. 16 is a perspective view of the improved packing element as formed in FIG. 15.
Figure 17:
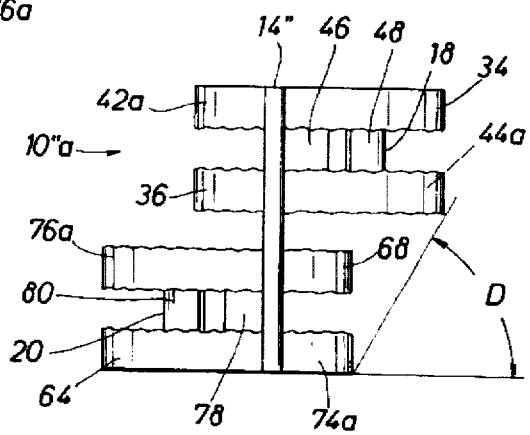
FIG. 17 is an end elevation of the packing element of FIGS. 15 and 16.

The variation in shape for packing elements according to the present invention, provided by bowing strips in opposite senses in the same plane, may be combined with shortened strips to restrain the packing element from extending and collapsing. FIG. 14 illustrates a packing element shown, generally at 10'a, which features shortened, constructed strips 38',40' and 78',80' as included in the packing element 10' illustrated in FIGS. 5 and 6, as well as a pattern of strips extending in common planes but bowed in opposite senses, as contained in the packing element 10a shown in FIGS. 11–13. The packing element 10'a also features a fib extending along each of the end attachment areas 12' and 14', provided by a right angle bend as in the case of the packing element 10' shown in FIGS. 5 and 6. FIGS. 15–17 illustrate a packing element, shown generally at 10"a, which features a shortened, constructed strip 82,84 as included in the packing element 10" illustrated in FIGS. 8–10, as well as a pattern of strips extending in common planes but bowed in opposite senses, as contained in the packing element 10a shown in FIGS. 11–13. The packing element 10"a also features a rib extending along each of the end attachment areas 12" and 14", provided by an approximately ninety degree arc as in the case of the packing element 10" shown in FIGS. 8–10. The projections not bonded together to form shortened strips in the packing elements 10'a and 10"a are oriented in various directions. Also, by separating the intermediate attachment areas of the packing elements 10'a and 10"a in opposite directions away from the respective plane defined by the corresponding end attachment areas, these packing elements may also be configured in a skewed shape, as may be appreciated by reference to FIG. 17 in the case of the packing element 10"a wherein the angle of skew D may be the same as any of the angles A, B or C, or may be different.

Another technique for varying the shape of a packing element according to the present invention is to vary the intermediate attachment areas. FIG. 18 shows a sheet of material 100 slit generally like the material 10 in FIG. 1, but featuring slits provided to form a singe intermediate attachment area 110 extending the width of the material and of the resulting packing element illustrated in FIGS. 19–21. Additionally, the packing element 100 features structured end attachment areas 112 and 114 each of which includes a rib formed by a V-shaped channel to provided strength and rigidity to resist bending or buckling of the packing element.

In particular, serrated slits 116 and 118 extend between the end attachment area 112 and the intermediate attachment area 110, and a slit 120 divides the material between the slits 116 and 118 into two projections 122 and 124. Serrated slits 126 and 128 extend between the end attachment area 114 and the intermediate attachment area 110, and a slit 130 divides the material between the slits 126 and 128 into two projections 132 and 134. There are no slits that extend completely from one of the end attachment areas 112 and 114 to the other. With the various strips bowed to form the shaped packing element 100 as shown in FIGS. 19–21, the projections 122 and 124 are bonded together as illustrated to provide a constructed strip 122,124 that prevents the separation of the end attachment area 112 from the intermediate attachment area 110, and the projections 132 and 134 are bonded together to form the constructed strip 132,134 that prevents the separation of the end attachment area 114 from the intermediate attachment area 110. Hence, the constructed strips 122, 124 and 132,134 resist the collapse of the packing element 100 due to the weight of other packing elements, or in the handling of the packing element, for example.

As illustrated, the packing element 100 is shaped with strips lying in the same plane bowed in opposite senses relative to the plane defined by the end attachment areas 112 and 114, as in the case of the strips of the packing element 10"a illustrated in FIGS. 15–17. However, the packing element 100 may also be shaped with strips lying in the same plane bowed in the same sense relative to the plane defined by the end attachment areas 112 and 114, as in the case of the strips of the packing element 10" illustrated in FIGS. 8–10, for example. Also, a combination of strips extending in the same plane being bowed in the same sense relative to the plane defined by the end attachment areas 112 and 114, and other strips extending in a common plane being bowed in opposite senses relative to the plane of the end attachment areas, could be used in shaping the packing element. In any case, the packing element 100 displays a shape that is not skewed as may be appreciated by reference to FIG. 21.

The formation of constructed strips to prevent the collapse of packing elements according to the present invention can be achieved by any suitable technique, such as any appropriate bonding of projections as noted above, for example. Another technique that can be utilized according to the present invention is to shorten a strip by folding, or crimping, the strip, for example. FIG. 22 shows a portion of a strip 180 that may be included in any of the packing elements shown in FIGS. 5–10 and 14–21, for example, or any other packing element made according to the present invention. The strip 180 features a fold 182 that effectively shortens the strip. The fold 182, which may be tightened even more than illustrated, may be made when other strips extending between the same two attachment areas as the strip 180 are being bowed, for example. The shortened strip 180 then prevents the two attachment areas in question from separating and the bowed strips therebetween from flattening.

Another technique for strengthening a packing element is to add appropriate structure to the strips and projections, for example. FIG. 23 shows a packing element member 220 which may be a strip or a projection, extending from an attachment area 212 between two other members 222 and 224. The member 220 features an elongate rib, or ridge, 226 running along the member 220 and generally centered laterally relative to that member. The lateral profile of the ridge 226 may be further appreciated by reference to FIG. 24 wherein it is clear that the ridge is V-shaped. The ridge, or crease, 226 resists bending of the member 220 at any angle lateral to the ridge. Once the member 220 is formed with the ridge 226, and, in the case of a strip, bowed, the member becomes relatively rigid and tends to retain its shape. FIG. 25 illustrates a packing element member 230, such as a strip or a projection, for example, featuring a curved profile channel-shaped rib 232 having a lateral profile in the shape of an arc as another embodiment of a structured member of a packing element according to the present invention.

It will be appreciated that a packing element according to the present invention may feature attachment areas between which one or more strips are bowed and also at least one shortened strip extends to prevent separation of the attachment areas and collapsing of the bowed strips. Further, a packing element according to the present invention may feature structured end attachment areas, including a rib, for example, to resist bending of the attachment areas and of the packing element. Also, the strips of a packing element according to the present invention may bow in opposite senses in the same plane relative to the plane defined by end attachment areas, and such a packing element may also include strips extending in a common plane bowing in the same sense relative to the plane of the end attachment areas. Additionally, a packing element according to the present invention may feature strips and projections that are ribbed to resist unwanted deformation of such members.

The present invention provides a packing element which, used in a packing bed of like packing elements in an exchange process chamber, for example, provides an abundant supply of liquid flow surfaces, drip points and flow-through passages for gas to enhance the interfacing of two fluids in the exchange process apparatus, and at the same time provides packing elements that are relatively strong and resist collapse or other deforming due to the weight of other packing elements stacked above in the process tower, or from handling, for example.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A packing element for use in exchange apparatus wherein a plurality of such packing elements may be disposed and within which first and second fluids may interact, said packing element comprising a generally planar sheet of material forming a plurality of strips with each strip attached at both of its ends, and further comprising at least one strip being generally straight and other strips being generally bowed.

2. A packing element as defined in claim 1 wherein the material also forms a laterally-extending end attachment area at each of two opposite ends of the material, and at least one laterally-extending intermediate attachment area, with strips extending between and attached to one intermediate attachment area and the end attachment areas.

3. A packing element as defined in claim 2 further comprising strips extending in generally opposite senses from an intermediate attachment area to each of the end attachment areas so that at least two such strips attached to the same intermediate attachment area generally extend along a common plane that is perpendicular to the plane defined by the two end attachment areas and are bowed in opposite senses relative to the plane defined by the two end attachment areas.

4. A packing element as defined in claim 2 wherein such a generally straight strip includes a fold of the material to shorten the length of the strip.

5. A packing element as defined in claim 2 wherein such a generally straight strip extends between the two end attachment areas.

6. A packing element as defined in claim 2 wherein such generally straight strip extends between an intermediate attachment area and an end attachment area.

7. A packing element as defined in claim 2 wherein at least one of the attachment areas includes a rib extending generally longitudinally along at least a portion of the length of the attachment area.

8. A packing element as defined in claim 1 wherein at least one of the strips includes a rib extending generally longitudinally along at least a portion of the length of the strip.

9. A packing element as defined in claim 1 further comprising one or more projections with each projection attached at one of its ends.

10. A packing element as defined in claim 9 wherein at least one of the projections includes a rib extending generally longitudinally along at least a portion of the length of the projection.

11. A packing element as defined in claim 9 wherein at least one such generally straight strip is formed by joining together two projections.

12. A packing element for use in exchange apparatus wherein a plurality of such packing elements may be disposed and within which first and second fluids may interact, said packing element comprising a generally planar sheet of material forming a plurality of strips with each strip attached at, and only at, both of its ends, generally parallel, laterally-extending end attachment areas at two opposite ends of the material defining a plane, at least one laterally-extending intermediate attachment area with at least one such intermediate attachment area having strips extending in generally opposite senses therefrom to each of the end attachment areas, with at least two such strips, which are attached to the same intermediate attachment area and extend in generally opposite senses to the end attachment areas, so extending generally along a common plane that is perpendicular to the plane defined by the two end attachment areas, and with at least some of the strips generally bowed relative to the plane defined by the end attachment areas, and further comprising two such strips generally extending along a common plane being bowed in opposite senses relative to the plane defined by the two end attachment areas.

13. A packing element as defined in claim 12 wherein at least one strip is generally straight.

14. A packing element as defined in claim 13 wherein such a generally straight strip includes a fold of the material to shorten the length of the strip.

15. A packing element as defined in claim 13 wherein such a generally straight strip extends between the two end attachment areas.

16. A packing element as defined in claim 13 wherein such a generally straight strip extends between an intermediate attachment area and an end attachment area.

17. A packing element as defined in claim 12 wherein at least one of the strips includes a rib extending generally longitudinally along at least a portion of the length of the strip.

18. A packing element as defined in claim 12 wherein at least one of the attachment areas includes a rib extending generally longitudinally along at least a portion of the length of the attachment area.

19. A packing element as defined in claim 12 further comprising one or more projections with each projection attached at one of its ends.

20. A packing element as defined in claim 19 wherein at least one strip is generally straight, and wherein at least one such generally straight strip is formed by joining together two projections.

* * * * *